United States Patent [19]

Kojima et al.

[11] Patent Number: 5,377,084
[45] Date of Patent: Dec. 27, 1994

[54] SURFACE ILLUMINATING APPARATUS

[75] Inventors: Takeshi Kojima; Shinpei Ninomiya, both of Osaka, Japan

[73] Assignee: T. Chatani & Co., Ltd., Osaka, Japan

[21] Appl. No.: 130,187

[22] Filed: Oct. 1, 1993

[30] Foreign Application Priority Data

Oct. 8, 1992 [JP] Japan .................. 4-270375

[51] Int. Cl.5 .................. F21V 8/00; F21V 5/02
[52] U.S. Cl. ............................ 362/31; 362/339
[58] Field of Search ............. 362/31, 339, 326, 357

[56] References Cited

U.S. PATENT DOCUMENTS

| | | | |
|---|---|---|---|
| 3,991,526 | 11/1976 | Frank et al. | 51/358 |
| 4,043,636 | 8/1977 | Eberhardt et al. | |
| 4,310,219 | 1/1982 | Jaccard . | |
| 4,791,540 | 12/1988 | Dreyer, Jr. et al. | 362/31 |
| 4,924,356 | 5/1990 | French et al. | 362/31 |
| 5,022,728 | 6/1991 | Fandrich . | |
| 5,093,765 | 3/1992 | Kashima et al. | 362/31 |
| 5,130,898 | 7/1992 | Akahane | 362/31 |

FOREIGN PATENT DOCUMENTS

| | | |
|---|---|---|
| 0534140 | 3/1993 | European Pat. Off. . |
| 58-38186 | 3/1983 | Japan . |
| 62-278505 | 12/1987 | Japan . |
| 3085586 | 4/1991 | Japan . |
| 118269 | 1/1919 | United Kingdom . |
| 948379 | 2/1964 | United Kingdom . |

*Primary Examiner*—Ira S. Lazarus
*Assistant Examiner*—Sara Sachie Raab
*Attorney, Agent, or Firm*—Stevens, Davis, Miller & Mosher

[57] ABSTRACT

A surface illuminating apparatus, which is provided with a transparent light guide plate 2, a reflecting plate 4 layered onto the rear surface of the light guide plate 2, and a light diffusion plate 6 layered onto the outer surface of plate 2. The light guide plate 2 and the reflecting plate 4 have an irregularly reflecting plate 3 therebetween. Light sources 8 are disposed at both lateral ends of the light guide plate 2, and formed on the outer surface of plate 2 is a light diffusion plate 6 having a plurality of spotted projections 7 regularly disposed and having a light condensing and diffusing function.

2 Claims, 3 Drawing Sheets

SURFACE ILLUMINATING APPARATUS

FIELD OF THE INVENTION

Present invention relates to a surface illuminating apparatus, and more particularly to a surface illuminating apparatus used mainly as back light for a liquid crystal display.

BACKGROUND OF THE INVENTION

Conventionally, this kind of surface illuminating apparatus is well-known as disclosed in, for example, Japanese Utility Model Laid-Open Gazette No. Sho 58-38186. The surface illuminating apparatus, as shown in FIGS. 7 and 8, is so constructed that a light guide plate A of acrylic resin high in transparency is used to form at one surface of the light guide plate A an irregularly reflecting layer B comprising a large number of fine spots for irregularly reflecting the light, the irregularly reflecting layer B is used as the rear surface and a reflecting plate C is layered thereon in a close contact manner, a light diffusion plate D is layered on the surface of the light guide plate A in a close contact manner, and light sources E are disposed at both lateral side surfaces of the light guide plate A, so that the light diffusion plate D is adapted to be illuminated at the entire surface thereof uniformly and brightly.

In the case where the surface illuminating apparatus constructed as the above-mentioned is used for back light of the liquid crystal display, the liquid crystal display, such as words, numerical values, or patterns, displayed throughout an entire liquid crystal display panel, need be recognized with uniform vision of an operator. Therefore, it is required to maintain throughout the entire surface of the liquid display panel a brightness uniformity higher than a predetermined value. Moreover, it is desired that the liquid crystal display, such as, words or numerical values, displayed on the liquid crystal display panel, even when viewed not only at a right angle with respect to the center of the display surface, but also in a range of an angle of visibility shifted at a predetermined angle (generally 60°) vertically and horizontally with respect to the center of the display surface, can be recognized with uniform vision.

The conventionally proposed surface illuminating apparatus cannot obtain sufficiently high brightness while keeping a uniform ratio of illuminance throughout the entire surface of the liquid crystal display panel, thereby creating the problem that the liquid crystal display cannot easily be recognized with uniform vision in a range of angles of visibility.

"Butler finish" means a surface finish in which a surface (of a light diffusion plate) is finished to a finely roughened surface like satin (a satin finish). Wrinkle process means a process for providing fine wrinkles and crimps on a surface, specifically a process in which in the manufacturing process of a film which forms a light diffusion plate, the film is inserted between a roller having a roughened surface and a roller having a smooth surface, so as to be toughened at one surface, while it is hot, so that, when it is cooled down, it is so crinkled as to have fine wrinkles and crimps.

These surface finishes and processes are both generally known.

In any case, the light condensing effect is low to thereby remain the problem in that a brightness in the range of an angle of visibility is insufficient, whereby sufficient recognition with uniform vision cannot be obtained over the entire surface of the liquid crystal panel.

In the present invention, the above problem has been researched so as to find that the light diffusion plate (FIG. 7) layered onto the surface of the light guide plate A is defective. The light diffusion plate D, which is so roughened by a wrinkle process so as to form a butler finish to obtain a uniform ratio of illuminance, has light condensing and diffusion properties to a certain extent. However, there is no regular light condensing function, and thus variation often occurs therein and the light condensing operation is not sufficient and the brightness is inadequate. The present invention involves alteration of the light diffusing plate.

SUMMARY OF THE INVENTION

In order to solve the above-mentioned problem, the present invention has been designed. An object thereof is to provide a surface illuminating apparatus with a surface formation of the light diffusion plate so that the brightness can be raised on the entire surface of the light diffusion plate without increasing the thickness of the whole apparatus.

In order to attain the above-mentioned object, in a surface illuminating apparatus which is provided with a transparent plate 2, a reflecting plate 4 layered on the rear surface thereof, a light diffusion plate 6 layered on the surface of the transparent plate 2, an irregular reflecting layer 3 between the transparent plate 2 and the reflecting plate 4. Light sources 8 are disposed at both lateral ends of the transparent plate 2 for radiating light into the transparent plate 2. A plurality of spotted projections 7 are formed on the outer surface which have light condensing and diffusion functions and are regularly disposed on the outer side surface of the light diffusion plate 6.

The spotted projections 7 formed on the light diffusion plate 6 are preferably hemispherical and disposed in a zigzag pattern.

The plurality of spotted projections 7 condense and diffusion function, on so that the light which having passed through the transparent plate 2 to effectively condense the light and the condensed light can be diffused, whereby while keeping a uniform ratio of illuminance, the brightness can be raised in the range of angle of visibility. Accordingly, when the present invention is applied to a liquid crystal display panel, greater recognition and uniform vision can easily be achieved throughout the entire surface of liquid crystal display panel.

In a case where the spotted projections 7 are each hemispherically formed, the lens effect makes it possible to efficiently condense the light, and the light is efficiently diffused at each projection 7, thereby enabling the brightness to be improved as a whole while maintaining a uniform ratio of illuminance.

Since the spotted projections 7 are disposed in a zigzag pattern the interval between the respective projections 7 can almost be uniform and minimum, the density of the spotted projections 7 occupying the entire area can be increased, whereby the light condensation and diffusion can properly be performed so as to increase the over-all brightness.

The above and further objects and novel features of the invention will more fully appear from the following

DETAILED DESCRIPTION OF THE INVENTION

Figure 1:
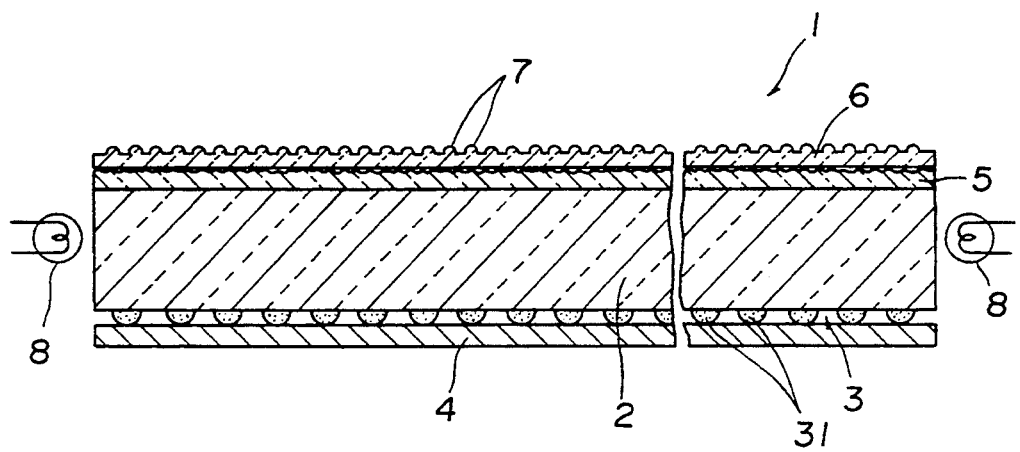
FIG. 1 is a partially cutaway sectional view of a surface illuminating apparatus of the present invention.

FIG. 1 shows part of the cross-sectional surface of a surface illuminating apparatus of the invention, in which the body comprises a transparent light guide plate 2 mainly of crystal resin of 4 to 5 mm thick, a reflecting plate 4 layered onto the entire rear surface of the light plate 2 in a close contact manner with spots 31 which form an irregular reflecting layer 3 which will be discussed later. A first light diffusion plate 5 made of polycarbonate or polyester resin is layered onto the outer surface of the transparent plate 2 in a close contact manner, and a second light diffusion plate 6 having characteristics of the present invention is layered onto the outer surface of plate 5. At both lateral ends of the body 1 opposite to each other are disposed light sources 8, such as incandescent lamps or fluorescent lamps, so that the light from the light sources 8 radiates into the transparent plate 2 and the light incident therein illuminates the entire surface of the second light diffusion plate 6.

In addition, in the above-mentioned construction, the irregularly reflecting layer 3 is formed on the rear surface of the transparent plate 2 opposite to the reflecting plate 4, and so constructed that a large number of fine spots 31 are printed in screen print by use of a frosted white paint mixed with, for example, fine glass beads, so as to depict particular patterns, whereby the light incident in the transparent plate 2 from the light sources 8 is partially irregularly reflected. In this case, it is preferable that the spots 31 are hemispherically shaped, but other shapes may be adopted. Also, the spot density may be increased as the spot 31 moves away from the light sources 8, but may be uniform in distribution.

The first light diffusion plate 5 is a conventional one which is provided at its outer surface to the transparent plate 2 with unevenness of butler finish which is not non-specific in form and is entirely milky. The first light diffusion plate 5 is not inevitably required, but preferred to be used for improving a uniform ratio of illuminance.

Next, explanation will be given concerning the second light diffusion plate 6, which is an important characteristic of the present invention. The second light diffusion plate 6 is formed of a sheet of resin, such as polycarbonate or polyester resin, the same as the first light diffusion plate 5 and is formed with a plurality of spotted projections 7 regularly disposed on the outer surface of the second light diffusion plate 6 with respect to the transparent plate 2 and having a light condensing and diffusing function.

Figure 2:
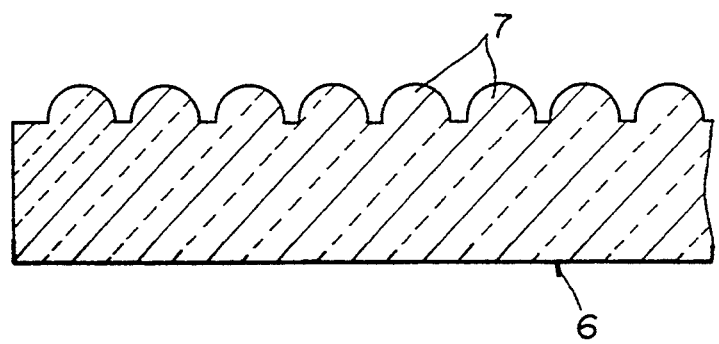
FIG. 2 is a partially cutaway sectional view of a second light diffusion plate in a first embodiment.
Figure 3:
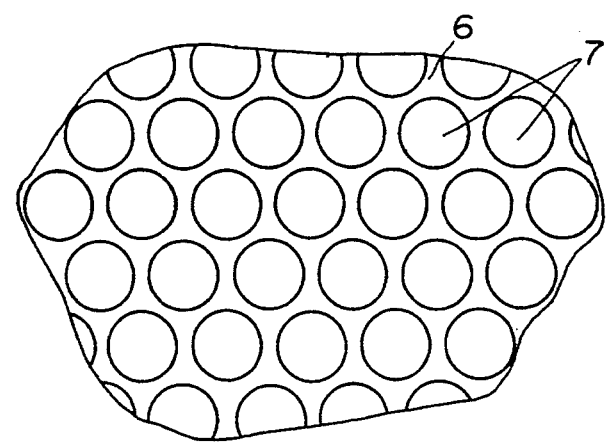
FIG. 3 is a partially cutaway top view of the FIG. 3 embodiment.

The spotted projections 7 are embossed by use of, for example, a embossing roll. In an embodiment shown in FIGS. 1 through 3, the spotted projections 7 each are hemispherically shaped and of diameter of about 40 $\mu$m, and a large number of the same are disposed regularly in a zigzag pattern as shown in FIG. 3.

A thickness of the second light diffusion plate 6 inclusive of the spotted projections 7 is preferred to be as thin as possible so as to correspondingly restrict the thickness of light guide plate 1 so that, when the embossing roll is used for molding, the thickness is, for example, 100 to 200 $\mu$m. Also, it is preferable that the spotted projections 7 each have pitch of 40 $\mu$m when the diameter of hemisphere is 40 $\mu$m, but the pitch may be larger than 40 $\mu$m. When larger than 40 $\mu$m of pitch, the spotted projections 7 adjacent to each other, as shown in FIG. 2, may be flat therebetween, but may be concaved in continuation of each projection 7.

In the surface illuminating apparatus constructed as the above-mentioned, the light incident in the light guide plate 2 from the light sources 8 travels in the light guide plate 2, and, when reaching the position of each spot 31 at the light guide plate 2, passes between the spots 31 and is reflected by the reflecting plate 4, or irregularly reflected by each spot 31 so as to repeat refraction and reflection, and then reaches the first light diffusion plate 5. The light is diffused thereby and reaches the second diffusion plate 6 so as to be efficiently condensed thereby and the condensed light is diffused by each spotted projection 7, thereby brightly and uniformly illuminating the entire surface of the second light diffusion plate 6.

Incidentally, when the uniformity ratio of illuminance and brightness of the first light diffusion plate 5 layered with the second light diffusion plate 6 is compared with the conventional two first light diffusion plates 5 layered each other, measurement results have been obtained as shown in Tables 1 and 2.

Figure 4:
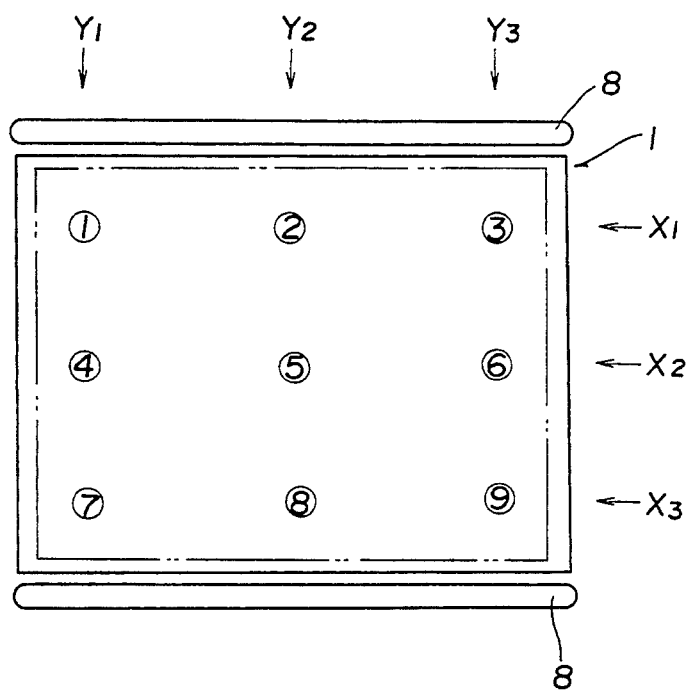
FIG. 4 is a view explanatory of measurement positions for measuring brightness of a light guide plate in the first embodiment and that of a conventional light guide plate.

The comparison data of both the components use the same specimens except for the second light diffusion plate 6 and the apparatus as a whole is 5.7 mm in gross thickness, 206 mm wide, and 149 mm long (an effective light emission unit is 206 mm in width and 144 mm in length) as shown by the two-dot broken line in FIG. 4. The light sources 8 are each of two-elongate-lamp system, 205 mm in length, 3.0 mm in diameter, and 5 watt input are used.

As shown in FIG. 4, at nine positions at the center and circumference of the light guide plate 2, in other words, at nine positions on the surface where axes of ordinates Y1, Y2 and Y3 and axes of abscissas X1, X2 and X3 are equally spaced from each other and the axes X and Y cross each other, the brightness when viewed from the vertical direction with respect to the light guide plate is measured. The measuring apparatus used is TOPCON BM-7 (by Topcon Co.).

Measurement results of the brightness of the first embodiment are shown in Table 1 as follows:

|    | Y1   | Y2   | Y3   |
| --- | --- | --- | --- |
| X1 | 2494 | 2493 | 2392 |
| X2 | 2270 | 2208 | 2192 |

-continued

|    | Y1   | Y2   | Y3   |
|----|------|------|------|
| X3 | 2282 | 2421 | 2433 |

(Unit: cd/m²)

where the uniformity ratio of illuminance has been 88% and the average brightness, 2354 cd/m².

In addition, the uniformity ratio of illuminance is obtained by (minimum measured value)/(maximum measured value)×100%.

Next, the measurement results of brightness of the conventional apparatus are shown in the following table:

|    | Y1   | Y2   | Y3   |
|----|------|------|------|
| X1 | 2203 | 2238 | 2168 |
| X2 | 1888 | 1980 | 1897 |
| X3 | 2024 | 2115 | 2128 |

(Unit: cd/m²)

where the uniformity ratio of illuminance has been 84% and the average brightness, 2071 cd/m².

From the above results, the surface illuminating apparatus of the present invention is about equal (somewhat improved in the measurement results) in uniformity ratio of illuminance to the conventional apparatus. Moreover, the average brightness is improved by about 11.4% so that it is understood that the brightness is improved as s whole while keeping the uniformity ratio of illuminance higher than a predetermined value and equalizing a gross thickness.

The result of measuring brightness of the apparatus of the present invention at a different angle is shown as follows:

At first, in FIG. 4, at the center of the apparatus body 1 and around the perpendicular direction with respect to the apparatus body 1 (the position at 90° from the surface thereof), brightness at each angle when viewed is represented by a when the angle is in gradient laterally, for example, in gradient toward the end surface side where no light source is disposed. Also, the brightness is represented by b when the angle is in gradient toward the end where the light source 8 is disposed.

|     | a            | b            |
|-----|--------------|--------------|
| 90° | 2211 cd/m²   | 2216 cd/m²   |
| 70° | 2015 cd/m²   | 2058 cd/m²   |
| 60° | 1729 cd/m²   | 1751 cd/m²   |
| 50° | 1332 cd/m²   | 1396 cd/m²   |
| 40° | 855 cd/m²    | 1059 cd/m²   |

Generally, in the case where the apparatus is applied to a liquid crystal plate, the angle of vision is 60° and it is required that the liquid crystal display is properly recognized in a uniform vision in a range of shifting vertically and horizontally at 30° each with respect to the position when vertically viewed at the center of the display surface of the liquid crystal display plate, the angle of vision in Table 3 being included in a range between 90° and 60°.

The measuring position of brightness in Table 3 is the intersection of the axis of coordinate Y2 and axis of abscissa X2, that is, the center indicated by ⑤, so that the brightness at the intersection is somewhat different from the measured 2208 cd/m² of the center as shown in Table 1, 2211 cd/m² and 2216 cd/m² at the 90° position in Table 3, but such brightness is included in a range of measurement error and becomes coincident with each other theoretically.

Accordingly, when the brightness is observed in a range of angle of vision (90° to 60° in Table 3) from the measuring results in Table 3, the brightness in the limit of the vertical and horizontal angle of vision somewhat lowers, but the same scarcely lowers in a range of angle of vision (90° to 70° in Table 3), that is, in a range of 40° of angle of vision usually used (the position at angle of 90° to 70° on the surface of the apparatus body), thereby enabling the brightness of the predetermined value to be obtained in the range of angle of vision.

In the embodiment shown in FIGS. 1 through 3, it is considered that the desired uniformity ratio of illuminance can be obtained and the brightness can be improved while the total thickness of the apparatus of the invention is made equal to that of the conventional one as above-mentioned because the large number of spotted projections 7 formed on the entire surface of the second light diffusion plate 6 are hemispherically shaped so that the respective spotted projections operate as the lens and are constructed in a manner of disposing a large number small lenses, the light having passed through the transparent plate 2 and first light diffusion plate 5 can efficiently be condensed by means of lens effect and the light condensed in the range of angle of vision can efficiently be diffused at the respective spotted projections 7.

The spotted projections 7 of the present invention are not limited in the above-mentioned hemispherical shape, but may be formed in a truncated pyramid or a truncated cone shape and also in a circular cylinder or a prism.

Figure 5:
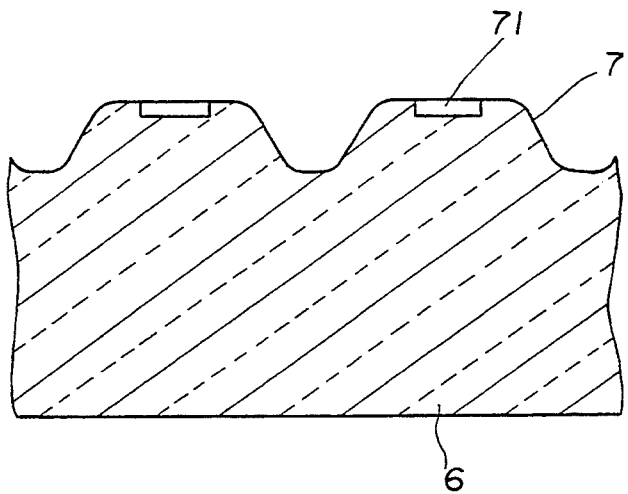
FIG. 5 is a partially cutaway sectional view of a light diffusion plate of a second embodiment.
Figure 6:
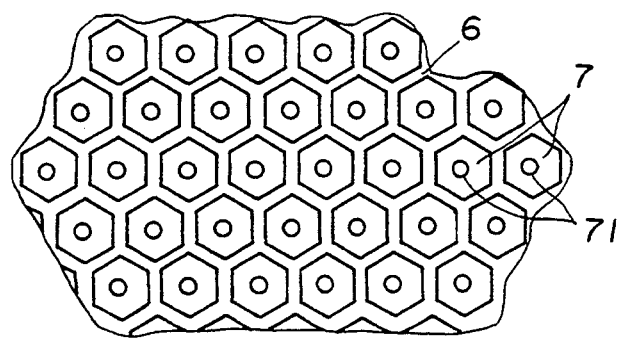
FIG. 6 is a partially cutaway top view of the FIG. 5 embodiment.
Figure 7:
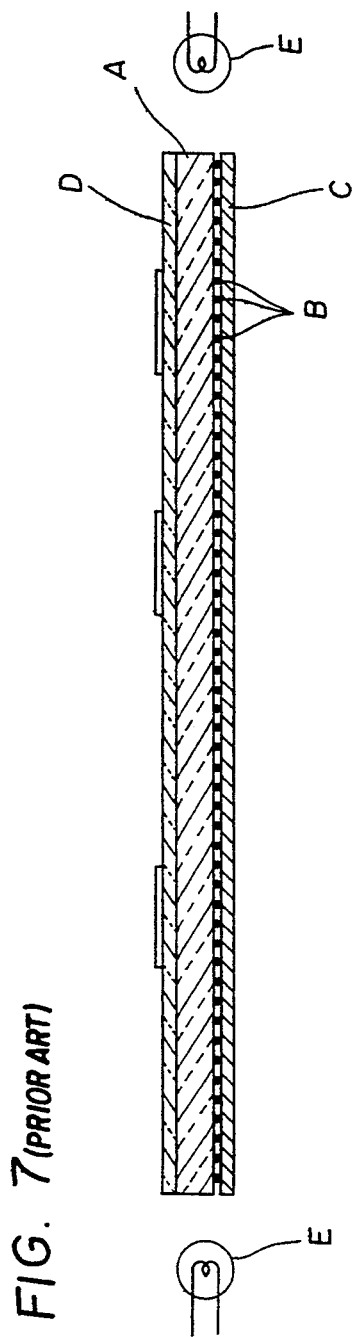
FIG. 7 is a sectional view of the conventional surface illuminating apparatus.
Figure 8:
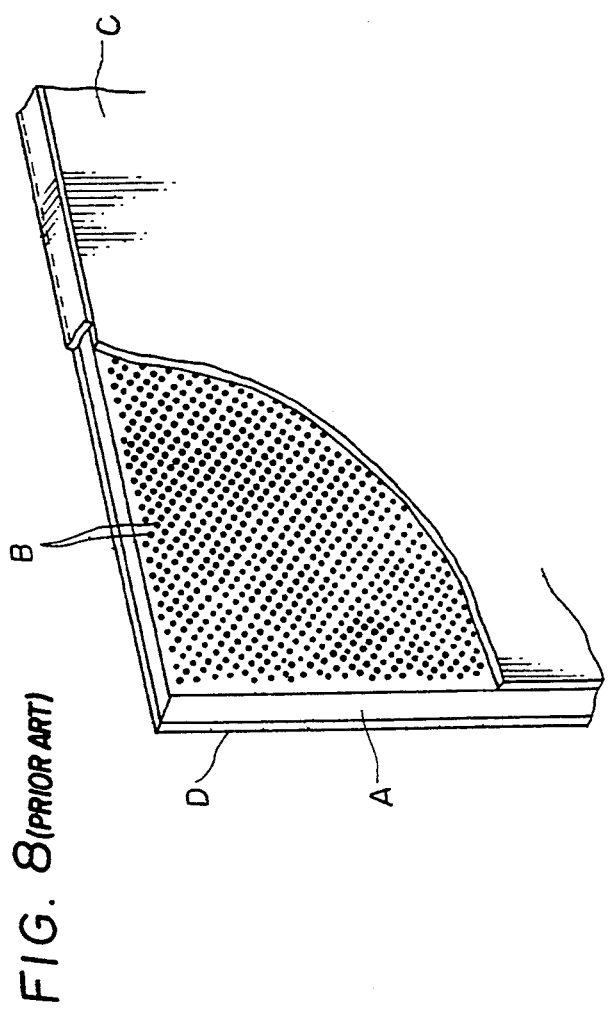
FIG. 8 is a partially cutaway perspective view of the FIG. 7 apparatus.

One of the embodiments of the projections is shown in FIGS. 5 and 6, in which the spotted projections each are formed at a truncated hexagonal shape. An interval between the surface of the the projections 7 is, for example, 40 μm in maximum and a tilted angle of each side is made, for example, of about 35°, at the center of the uppermost surface is formed a round recess 71 of 7.5 μm in diameter, and the spotted projections 7 are disposed zigzag in a pattern the same as the first embodiment shown in FIGS. 1 through 3.

Each spotted projection 7 can also be formed by, for example, an embossing roll and obtain the same effect as the first embodiment, whereby the brightness can be improved by obtaining the predetermined uniformity ratio of illuminance and without increasing the total thickness of the apparatus.

In addition, the round recess 71 are formed to raise the light diffusion efficiency at the top surface so as to improve the brightness, so that the second light diffusion plate 6 provided with the recesses 71 can more improve the brightness to a greater degree than that provided with no recesses 71. Besides this, the round recesses 71 are preferable to be analogous to the spotted projections 7 in cross-section respectively.

In the above-mentioned construction, the spotted projections 7 can be freely set in height and also set the pitch therebetween corresponding to the desired brightness, so that there is no need that they are disposed in a zigzag pattern.

In the first embodiment, the first light diffusion plate 5 of butler finish is used and the second light diffusion plate 6 having the spotted projections 7 is layered on the first light diffusion plate 6, but the first light diffusion plate 5 may be omitted. However, the brightness can be higher by use of the first light diffusion plate 5 than is the case where the first light diffusion plate 5 is not used but only the second light diffusion plate 6 is used.

As seen from above, the light guide plate of present invention is provided at its outer surface with a plurality of spotted projections 7 regularly disposed and having a light condensing and diffusing function, so that the light having passed through the transparent plate 2 can effectively be condensed by the spotted projections 7 and thus condensed light can efficiently be diffused, whereby the brightness can be higher than that of the conventional apparatus while keeping the desired uniformity ratio of illuminance and without increasing the total thickness of the apparatus. Accordingly, in the case where the apparatus of the present invention is applied to a liquid crystal display panel, recognition in uniform vision can easily be performed throughout the entire surface of the liquid crystal display panel.

In the case where the spotted projections 7 each are formed in a hemispherical shape, the lens effect can obtain the proper light-condensing, and also the light can efficiently be diffused at the respective projections 7, thereby enabling the brightness to be improved as a whole while keeping uniformity of illuminance.

Also, the spotted projections 7 are disposed in a zigzag pattern so that an interval between the respective projections 7 can be almost equal and at a minimum when measured vertically, horizontally and obliquely. Hence, the spotted projections 7 occupying the entire surface area can increase in density, whereby the light condensing and diffusing by the projections 7 can further be proper as a whole and the brightness can further be improved.

While an embodiment of the invention has been shown and described, the invention is not limited to the specific construction thereof, which is merely exemplary in the specification rather than limiting is defined.

What is claimed is:

1. A surface illuminating apparatus provided with
   a body comprising a transparent light guide plate having an outer surface and a rear surface, a reflecting plate layered onto the rear surface of said light guide plate, and a light diffusion plate layered on the outer surface of said light guide plate; and light sources disposed at lateral ends of said light guide plate for irradiating light to said light guide plate;
   said light diffusion plate having an outer surface with a plurality of spotted projections regularly disposed thereon and having light condensing and diffusing properties; said spotted projections being shaped as truncated pyramids and having tops with round recesses.

2. A surface illuminating apparatus according to claim 1, wherein said plurality of spotted projections provided at said light diffusion plate are disposed in a zigzag pattern.

* * * * *